April 19, 1932.  H. M. ALLISON ET AL  1,854,242
MACHINE FOR MEASURING TAPS
Filed Oct. 22, 1928  4 Sheets-Sheet 2
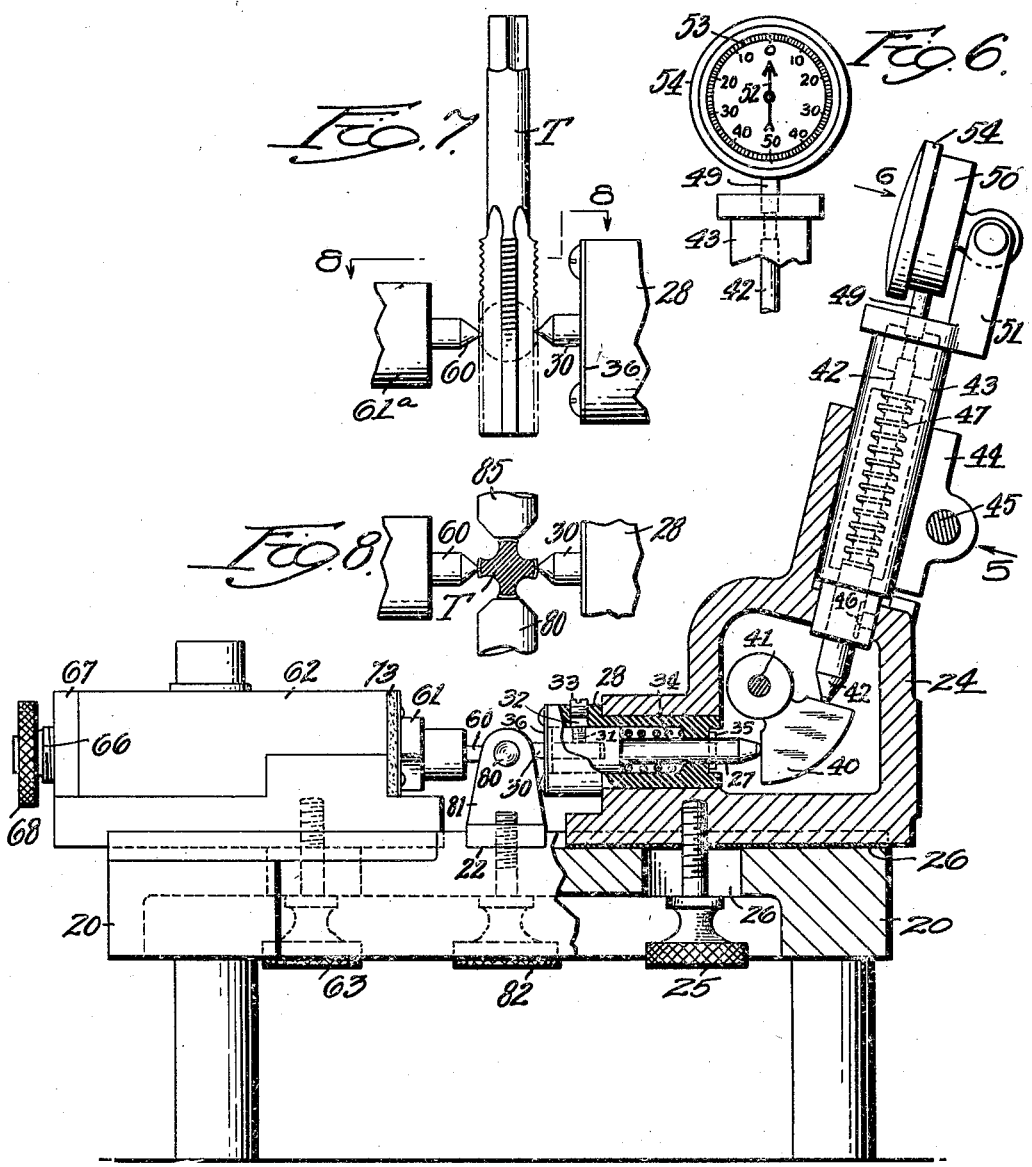
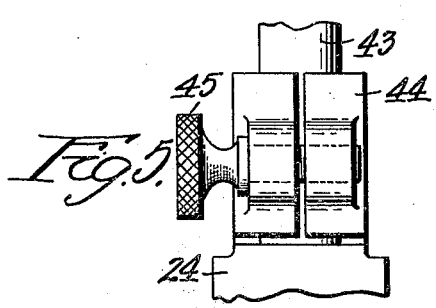

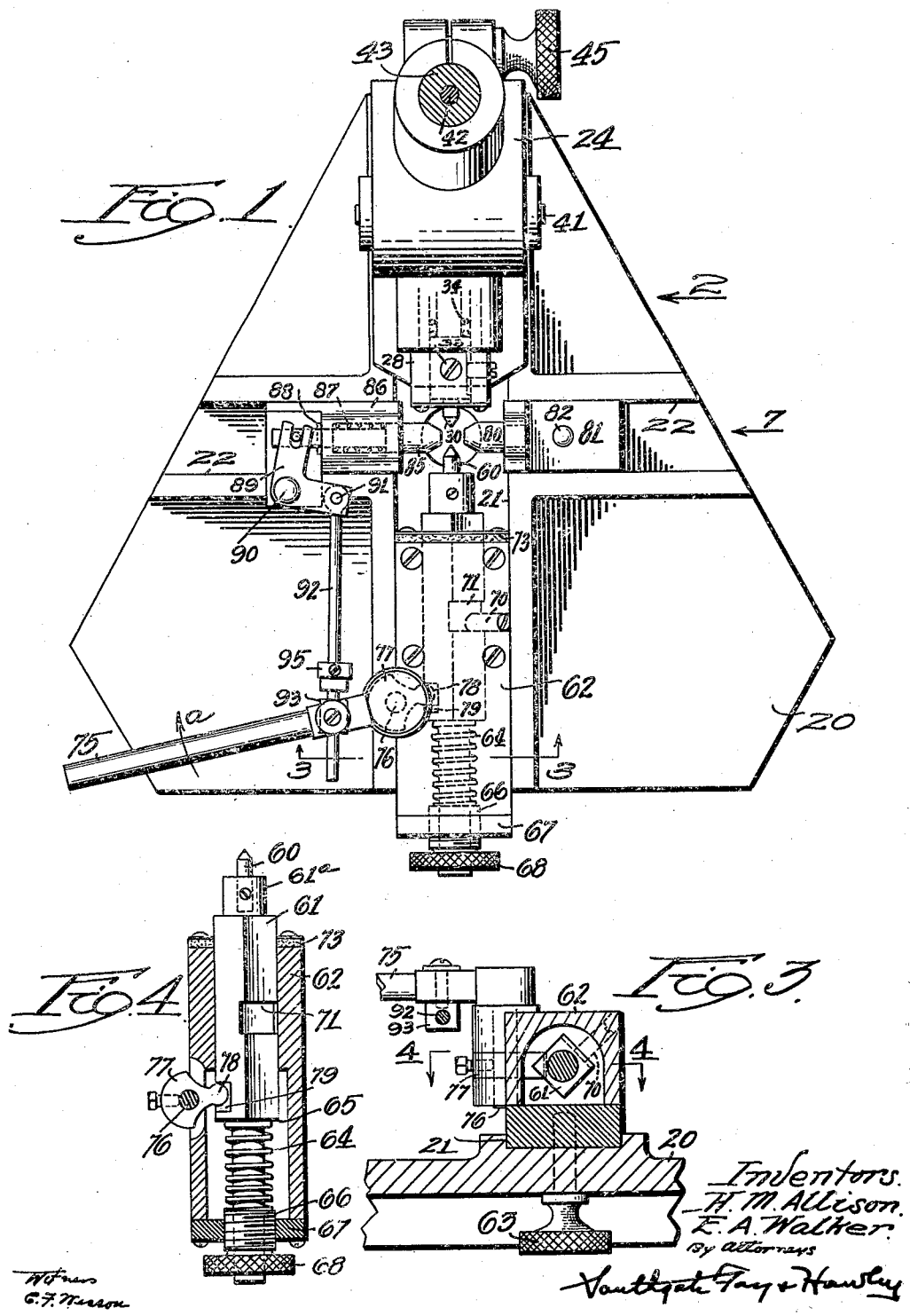

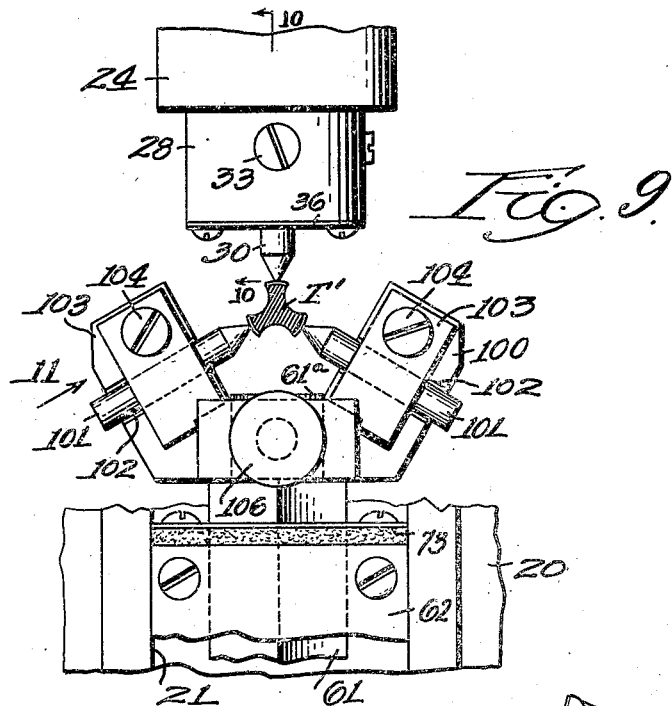
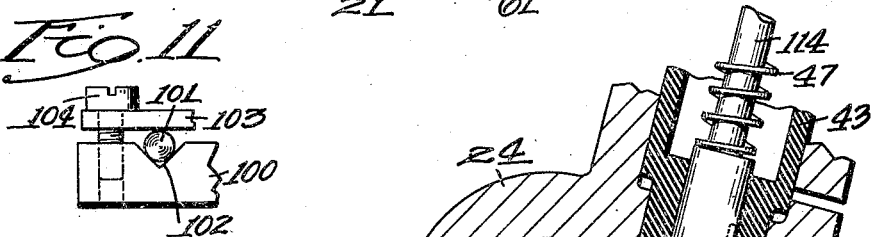
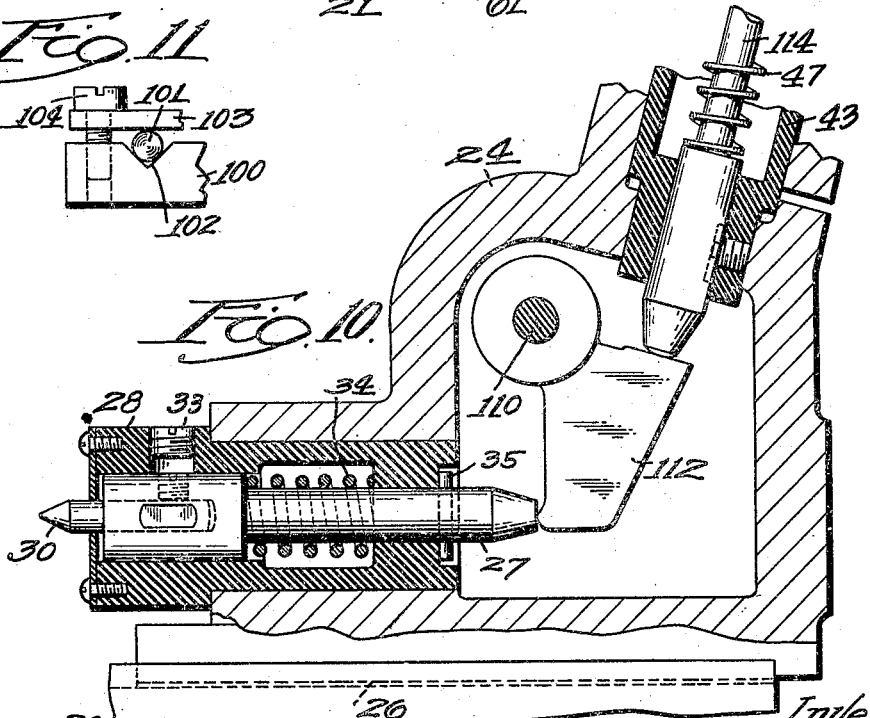

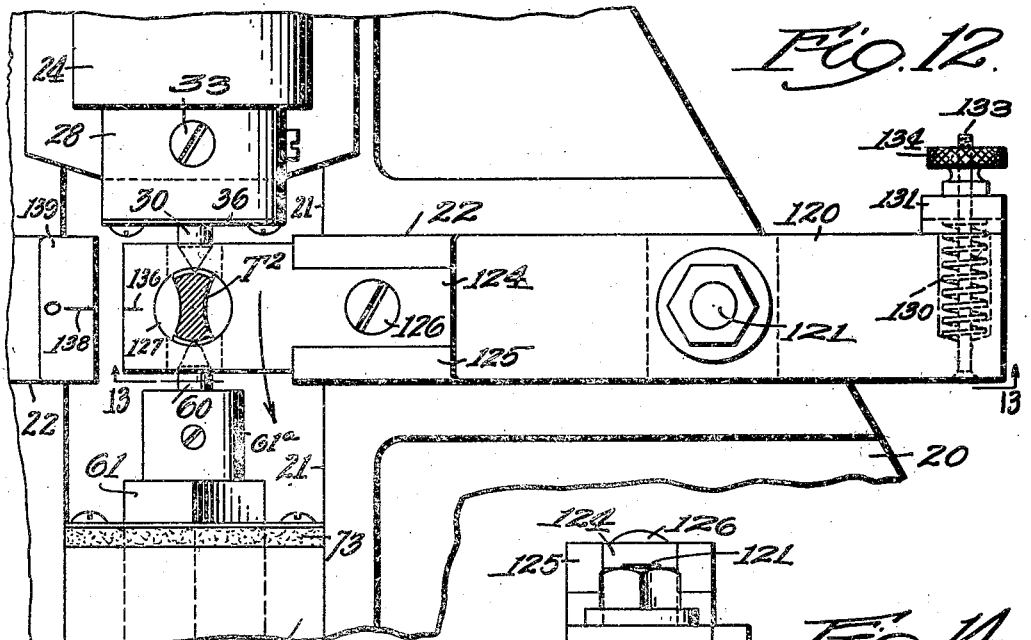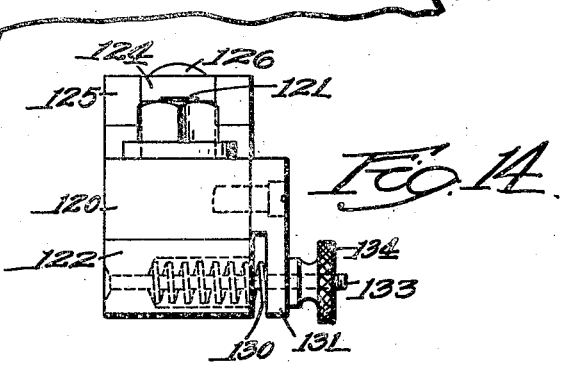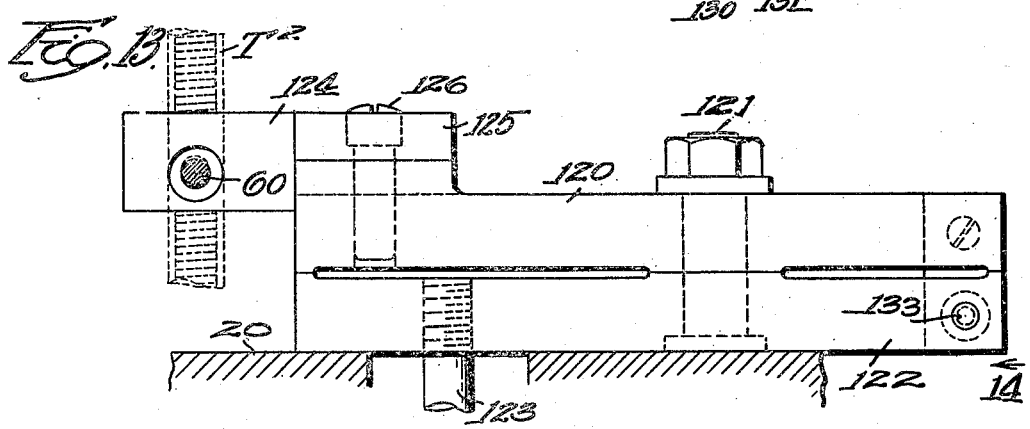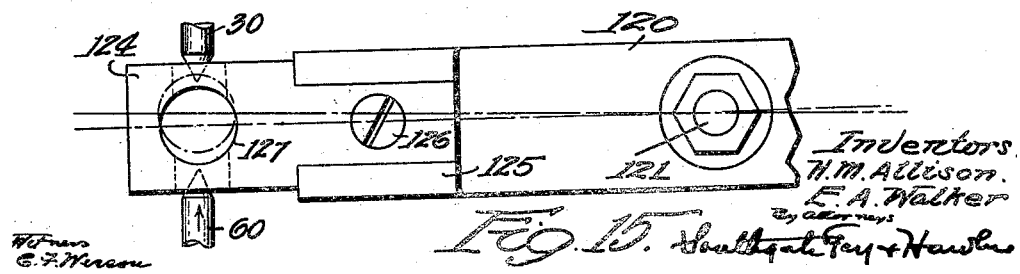

Patented Apr. 19, 1932

1,854,242

UNITED STATES PATENT OFFICE

HARVEY M. ALLISON AND ERNEST A. WALKER, OF WORCESTER, MASSACHUSETTS, ASSIGNORS, BY MESNE ASSIGNMENTS, TO JOHN BATH, OF WORCESTER, MASSACHUSETTS

MACHINE FOR MEASURING TAPS

Application filed October 22, 1928. Serial No. 314,032.

This invention relates to a machine for measuring taps or other threaded work and particularly to a machine for indicating variations in size of such work with respect to a standard or master gauge.

It is the general object of our invention to provide a machine by which such measurements and comparisons may be quickly and easily made and by which the comparative variations from a standard gauge will be plainly shown.

A further object is to provide a measuring machine which may be readily adapted to the measurement of taps of different sizes and pitches.

Our invention further relates to arrangements and combinations of parts which will be hereinafter described and more particularly pointed out in the appended claims.

A preferred form of the invention and certain modifications thereof are shown in the drawings in which Fig. 1 is a plan view of our improved machine, adapted to the measurement of four-fluted taps;

Fig. 2 is a side elevation thereof, partly in section, and looking in the direction of the arrow 2 in Fig. 1;

Fig. 3 is a partial sectional front elevation, taken along the line 3—3 in Fig. 1;

Fig. 4 is a sectional plan view, taken along the line 4—4 in Fig. 3;

Fig. 5 is a detail rear view, looking in the direction of the arrow 5 in Fig. 2;

Fig. 6 is a detail front view, looking in the direction of the arrow 6 in Fig. 2;

Fig. 7 is a detail side elevation, looking in the direction of the arrow 7 in Fig. 1;

Fig. 8 is a sectional plan view, taken along the line 8—8 in Fig. 7;

Fig. 9 is a partial plan view of a modified construction;

Fig. 10 is a sectional side elevation, taken substantially along the line 10—10 in Fig. 9 but showing additional parts;

Fig. 11 is a detail side elevation, looking in the direction of the arrow 11 in Fig. 9;

Fig. 12 is a partial plan view of a second modified construction;

Fig. 13 is a sectional front elevation thereof, taken along the line 13—13 in Fig. 12;

Fig. 14 is an end view, looking in the direction of the arrow 14 in Fig. 13; and Fig. 15 is a partial plan view, showing certain of the parts in a different position.

Referring particularly to the form shown in Figs. 1 to 8, our improved measuring machine comprises a stand or table 20 (Fig. 1) having guideways 21 and 22 formed on the upper surface thereof, in the shape of a rectilinear cross.

A stand or casing 24 is slidable in the rear portion of the guideway 21 and may be secured in adjusted position therein by a clamping screw 25 (Fig. 2) extending through a slot 26 in the table 20. A thin plate or shim 26 is interposed between the under surface of the casing 24 and the bottom of the guideway 21, for a purpose to be described.

A plunger 27 is slidable in a bushing 28 fixed in the casing 24 and is provided with a contact member 30 which may be secured therein by a set screw 31 (Fig. 2). Access to the screw 31 may be had through an opening 32 in the bushing 28, said opening being normally closed by a screw 33. A spring 34 presses the plunger 27 yieldingly outward and a pin 35 limits the outward movement. The front end of the bushing 28 may be provided with a cover plate 36 through which the contact member 30 is slidable. The cover plate assists in preventing the access of dirt to the indicating mechanism.

A segment member 40 is pivoted at 41 in the casing 24 and forms an angle connection between the rear end of the plunger 27 and the lower end of a spring-pressed plunger 42, slidable vertically in a bearing member 43 mounted in a split holder 44 on the casing 24. The member 43 may be secured in desired adjusted position by tightening the split holder 44 by means of a clamping screw 45 (Fig. 5).

The plunger 42 is loosely keyed and slidable in the bearing frame 43, as indicated at 46, and is provided with a spring 47 yieldingly pressing the plunger downward. At its upper end, the plunger 42 engages the piston 49 of a magnifying and indicating device 50, preferably mounted on an upward projection 51 (Fig. 2) of the bearing frame 43.

The indicating device 50 is provided with a pointer 52 movable by the plunger 42 and piston 49 over a dial 53. The dial 53 is preferably mounted in a ring 54 frictionally held on the casing of the indicator 50, so that it may be turned angularly as desired in either direction.

The indicating device 50 may be otherwise of any usual commercial form and the remaining details thereof form no part of our present invention.

A second contact member or anvil 60 (Figs. 1 and 4) is secured in a plunger 61, formed of a square bar slidable in a stand 62. The stand 62 is adjustable forward and rearward in the front portion of the guideway 21 and may be secured in adjusted position in said guideway by a clamping screw 63.

A spring 64 (Fig. 4) is interposed between a shoulder 65 on the plunger 61 and a bushing 66 threaded in a cap 67 at the front end of the stand or casing 62. The bushing 66 has a knurled head 68 for convenient adjustment of the tension on the spring 64. It will be understood that the spring 64 is very substantially stronger than the spring 34 on the plunger 27 previously described.

A stop pin 70 (Fig. 1) projects into a slot 71 in the square plunger 61 and engages an end wall of the slot, thereby limiting rearward movement of the anvil or contact member 60 and providing a definite zero position thereof. A felt packing 73 prevents the entrance of dirt around the plunger 62.

A hand lever 75 is provided with a stud 76 (Fig. 3) pivoted in a fixed bearing in the stand 62 and having a member 77 secured thereto. The member 77 has a convex head 78 positioned in a slot 79 in the plunger 61. By turning the handle 75 in the direction of the arrow $a$ in Fig. 1, the plunger 61 may be forced forward or away from the work, compressing the spring 64. The head 78 has a limited lost motion in the slot 79.

A fixed side positioning or guide member 80 (Fig. 1) is mounted in a bracket 81, adjustable in the right hand guideway 22 and secured in adjusted position by a clamping screw 82 (Fig. 2).

A movable side positioning or guide member 85 is yieldingly mounted in a stand 86, adjustable in the left hand guideway 22 and secured in adjusted position therein by a clamping screw (not shown but corresponding to the screw 82 previously described). A spring 87 forces the plunger 85 yieldingly outward, and such outward movement is limited by a stop pin 88.

A bell crank 89 is pivoted at 90 on the table 20. One arm thereof has a slot and pin connection with the plunger 85, as clearly shown in Fig. 1. The other arm is pivotally connected at 91 to a rod 92 slidable in a block 93 (Fig. 3) pivotally mounted on the under side of the lever 75. The block 93 engages a collar 95 adjustable on the rod 92.

When the handle 75 is turned in the direction of the arrow $a$ in Fig. 1, the block 93 first engages the collar 95 and causes slight withdrawal of the plunger 85 before the head 78 of the member 77 engages the front wall of the slot 79 and withdraws the anvil 60.

Having described the details of construction of the form of our invention designed for measuring four-fluted taps, the method of operation thereof is as follows:

The handle 75 is first moved in the direction of the arrow $a$ in Fig. 1 to withdraw the plungers 60 and 85, and a standard or master thread gauge is then placed in position between the several plungers. The fixed gauge 80 is adjusted along the guideway 22 to such a position that the axis of the master gauge intersects a line joining the centers of the plungers 30 and 60, and the casing or stand 62 is adjusted in the guideway 21 so that the axis of the master gauge when seated against the anvil 60 will be intersected by the axis of the plungers 80 and 85.

The casing 24 for the indicating plunger 30 is then adjusted forward or rearward to cause the plunger 30 to be engaged by the master gauge when positioned by the plungers 60, 80 and 85 and to cause said plunger to be moved inward in the bushing 28 a short distance, compressing the spring 34.

The bearing frame 43 is then adjusted axially to place the plunger 42 under compression and to move the pointer 52 in the indicating device a certain angular amount, say one revolution, from its zero or base position.

The parts are secured in these adjusted positions and the dial ring 54 is then turned on the indicating device 50 to bring the zero of the dial to correspond to the position of the arrow 52.

The master gauge is then removed and a tap T substituted therefor, the handle 75 being moved in the direction of the arrow $a$ to hold the plungers 60 and 85 withdrawn during the removal and insertion of the taps or gauges.

As soon as the handle is released, the plunger or anvil 60 moves rearward to its fixed position, as determined by the stop pin 70, and the side plunger 85 thereafter forces the tap laterally against the fixed side plunger 80. The rearward movement of the anvil 60 has already forced the tap against the indicating plunger 30 and has moved the plunger 30 rearward a certain distance, depending upon the exact diameter of the tap T. Any variation in diameter will be made evident by a glance at the indicating device 50, the pointer indicating the variation over size or under size by its movement in one direction or the other from the fixed zero. The dial as shown is graduated to read the variation in tenths of thousandths, but the variation may be magnified to any desired additional extent.

By the use of the machine above described, we are able to inspect taps with ease and rapidity and to very quickly and accurately determine any variation thereof, either over or under the standard diameter as fixed by the master gauge.

When a tap is held in a vertical position, as indicated in Fig. 7, it will be clear that the anvil 60 and the indicating plunger 30 will engage the tap in different horizontal planes, determined by the pitch of the thread, the member 30 being positioned above the anvil 60 by an amount equal to one half of the lead of the tap. As this distance varies for taps of different pitches, we provide a series of shims 26 of different thicknesses, so that a shim may be selected for a desired pitch which will elevate the indicating plunger 30 by the desired amount above the plane of the anvil 60.

The points of the plungers 30 and 60 are suitable shaped to engage between the screw threads. The points are then generally hardened or may be provided with diamond points.

In Figs. 9 to 11, we have shown an adaptation of our measuring machine by which it is adapted for the measurement of three-fluted taps. For this purpose, the square plunger 61 previously described has a swivel member 100 loosely mounted on the cylindrical extension 61ª of said plunger. Contact members 101 are seated in V-shaped grooves 102 in the member 100 and are secured in axially adjusted position therein by clamps 103 and clamping screws 104.

The grooves 102 are disposed at an angle of 120 degrees from each other and the contact members 101 are equally spaced from the axis of the plunger 61. It will be evident that the thread groove as engaged by one of the members 101 will be at a slightly different elevation from the thread groove as engaged by the other member 101, due to the lead of the thread.

By loosely pivoting the swivel member 100 on the plunger 61, we are able to turn the member angularly and thus set the contact members 101 at an angle to correspond to the lead of the tap to be measured, this angle varying according to the pitch of the thread. When correctly set, the member 100 may be secured in fixed position on the plunger 61 by a clamping screw 106.

The indicating plunger and mechanism is substantially the same as previously described, but the axes of the plungers are so disposed with respect to the pivot 110 of the segment member 112 that the movement of the upper plunger 114 is reduced in the proportion of three to two, this change in leverage being made necessary by the sixty degree engagement of the contact members 101 with two of the three sets of teeth on the tap T'. While the ratio of three to two is theoretically correct only for the exact diameter for which the contact points are adjusted, the error introduced by using this ratio is negligible within the very limited range of diameter variations which the machine is called on to indicate without readjustment. Except for the provision of the swivel head 100 and for the change in leverage of the segment member 112, the construction and operation is identical with the form previously described.

In Figs. 12 to 15, we have shown our invention as applied to the measurement of taps having only two sets of teeth. For this purpose we omit the side plungers, as the bottoms of the flutes are commonly rough finished and not particularly accurate in dimensions. In place of the side plungers we provide a lever 120, pivoted on a stud 121 fixed in a stand 122 adjustable in the transverse guideway 22 and secured in adjusted position by a clamping screw 123 (Fig. 13).

A positioning member 124 is mounted in guideways 125 (Fig. 12) on the lever 120 and may be secured in position thereon by a clamping screw 126. An opening 127 is formed in the member 124 in such a position as to be axially aligned with the plungers 30 and 60 previously described. The opening 127 is very slightly larger than the outside diameter of the tap to be measured and thus serves to center the tap between the plungers 30 and 60.

In order to permit the tap T² to be inserted through the opening 127, we have provided a spring 130 (Fig. 14) engaging an offset arm 131 on the lever 120 and acting to move the arm to the inoperative position indicated in Fig. 15, such movement carrying the positioning member 124 forward or away from the indicating plunger 30 to a point where a tap may be inserted through the opening 127 without engaging the point of the plunger 30.

A stud 133 extends through the stand 122, the spring 130 and the arm 131, and is provided with a nut 134 by which the amount of swinging movement may be limited.

For convenience in setting up the machine for different lots of taps, we provide a graduation 136 (Fig. 12) on the positioning member 124, in exact alignment with the center of the opening 127. We also provide a graduation 138 on a setting stand 139, mounted in the left hand portion of the guideway 22. In setting up the machine, the plunger 60 and its stand may be adjusted until the tap T² positioned by the member 124 aligns the graduation 136 thereof with the graduation 138 on the setting stand 139.

When a tap is to be changed, the plunger or anvil 60 may be withdrawn by the handle 75 (Fig. 1), as previously described, and the spring 130 will swing the member 124 to the position shown in Fig. 15, in which position a tap may be removed or inserted without striking the points of the plungers 30 or 60.

The specific details of the mechanism shown in Figs. 9 to 11 and in Figs. 12 to 15 are not claimed herein but form the subject matter of divisional applications Serial Nos. 441,152 and 441,153 filed April 2, 1930.

Having described our improved measuring machine and its application to taps having two, three or four flutes, the use and utility of the machine will be readily apparent as well as its application to taps having any other number of flutes. Accordingly, we do not wish to be limited to the details herein disclosed, otherwise than as set forth in the claims, but what we claim is:—

1. In a machine for measuring taps, a yieldingly positioned contact member, indicating mechanism actuated thereby, a movable positioning member forming an anvil for the tap to be measured and having a predetermined operative position, a spring effective to force said positioning member to its predetermined operative position and to act through an inserted tap to overcome said yieldingly positioned contact member, additional fixed and movable side guide members, and common actuating means for withdrawing said positioning member and said movable side member from operative position.

2. In a machine for measuring taps, a yieldingly positioned contact member, indicating mechanism actuated thereby, a movable positioning member forming an anvil for the tap to be measured and having a predetermined operative position, a spring effective to force said positioning member to its predetermined operative position and to act through an inserted tap to overcome said yieldingly positioned contact member, additional fixed and movable side guide members, common actuating means for withdrawing said positioning member and said movable side member from operative position, said common actuating means including linkage, operatively connecting said positioning member and said movable side member, whereby to effect a predetermined succession in the movements thereof, and cause said positioning member to engage and position the tap against said contact member before said movable side member engages said tap to position said tap transversely against said fixed side member.

3. In a machine for measuring taps, a movable contact member, an indicating device, and means connecting said device to said contact member for operation thereby, a positioning member providing an anvil for the tap, a fixed side guide member, a movable side guide member, said several parts engaging the tap at the four sides thereof, and means effective to cause a predetermined succession in the movements of said positioning member and said movable side member, whereby said members engage the tap successively.

4. In a machine for measuring taps, a movable contact member, an indicating device, and means connecting said device to said contact member for operation thereby, a positioning member providing an anvil for said tap, a fixed side guide member, a movable side guide member, said several parts engaging said tap at the four sides thereof, and a single manually operable lever for said movable members, and means connecting said lever and movable members whereby said lever is effective to withdraw said movable side guide member and said positioning member successively from operative position.

5. In a machine for measuring taps, a movable contact member, an indicating device, and means connecting said device to said contact member for operation thereby, a positioning member providing an anvil for said tap, a fixed side guide member, a movable side guide member, said several parts engaging said tap at the four sides thereof, and means effective to cause a predetermined succession in the movements of said positioning member and said movable side member, whereby said members engage a tap successively, and a spring effective to move said positioning member and tap to a predetermined fixed position after engagement of said member with said tap.

6. In a machine for measuring taps, a movably mounted contact member, an indicating device, and means connecting said device to said contact member for operation thereby, a movably mounted positioning member substantially aligned with said contact member, a fixed stop to indicate the operative advanced position of said positioning member, an actuating spring for each of said members, and means to withdraw said positioning member from operative position, the spring for said positioning member being substantially stronger than the spring for said contact member and when released being effective to overcome said latter spring and return said positioning member to initial position while engaged with a tap held between said positioning and indicating members, and a side guide member angularly disposed with respect to said aligned members.

In testimony whereof we have hereunto affixed our signatures.

HARVEY M. ALLISON.
ERNEST A. WALKER.